May 24, 1949.  J. E. GAY  2,471,208
PORTABLE DRILL BRACE
Filed Oct. 28, 1947
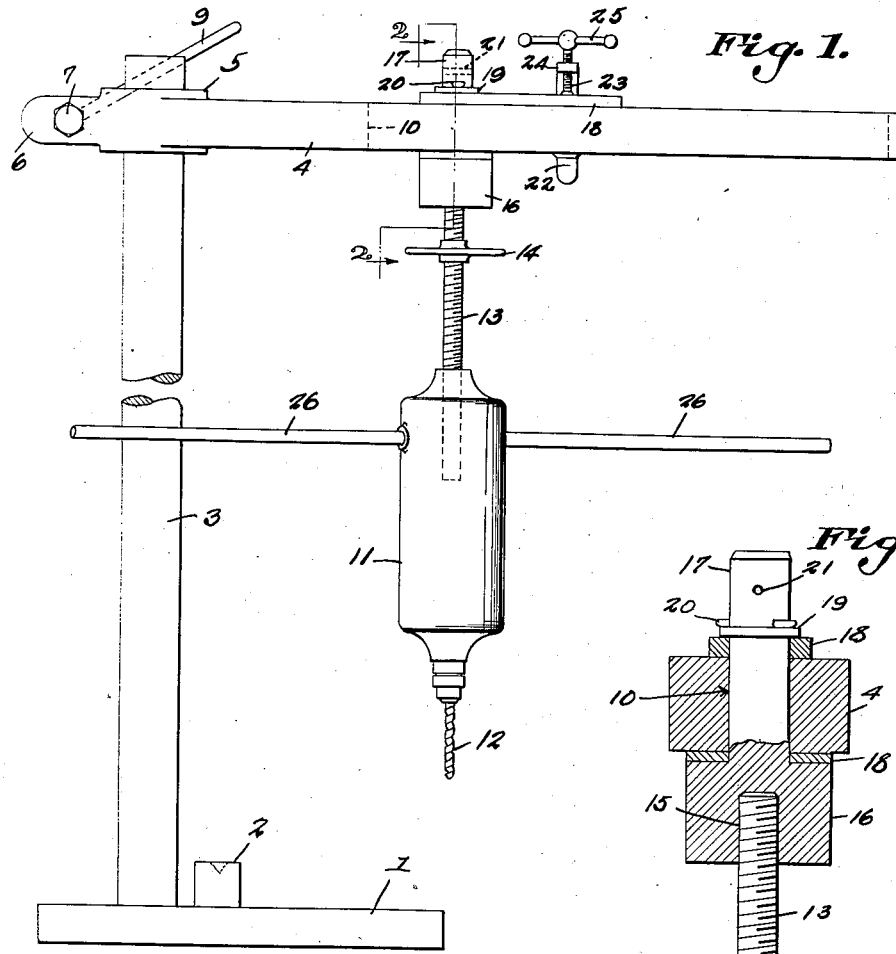
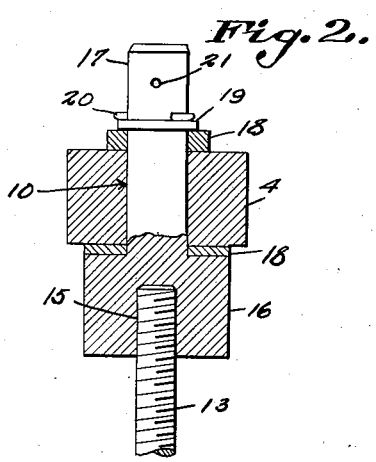
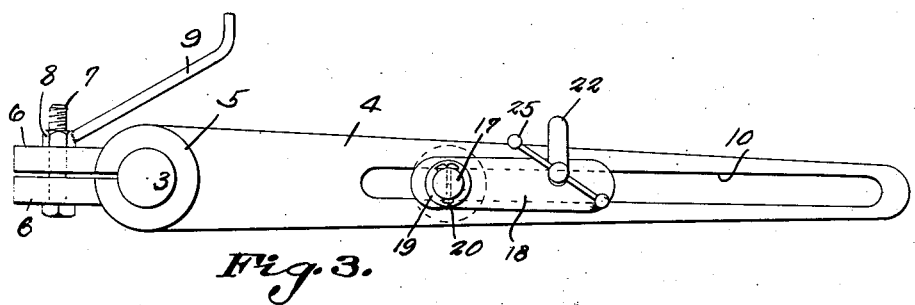
J. E. Gay
INVENTOR
BY C. A. Snow & Co.
ATTORNEYS

Patented May 24, 1949

2,471,208

UNITED STATES PATENT OFFICE 2,471,208

PORTABLE DRILL BRACE

John E. Gay, Newborn, Ga.

Application October 28, 1947, Serial No. 782,593

1 Claim. (Cl. 77—59)

My present invention relates to the general class of boring and drilling appliances, of the type including a portable motor-operated rotary or radial drill, and more specifically to an improved portable drill brace or appliance that is well known as an "old man," which while adapted as a drill mount or jig for various purposes and uses, is especially designed for metal boring or drilling in shipyards and other plants where numerous and successive boring operations are required.

The invention consists in certain novel features of construction and combinations and arrangements of parts in a suspending unit for a motor-operated drilling appliance, as a compressed air or pneumatic drill, by means of which the hand-manipulated drill may be adjusted, handled, and controlled by one or more men with convenience, and with a minimum expenditure of time and labor.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures within the scope of my appended claim, without departing from the principles of the invention.

Figure 1 is a view in side elevation of a drilling appliance in which my invention is embodied, and including a conventional pneumatic rotary drill.

Figure 2 is an enlarged vertical sectional view at line 2—2 of Fig. 1 through the suspension head for the drill; and Figure 3 is a top plan view of the appliance shown in Fig. 1.

In order that the general arrangement and utility of parts may readily be understood I have illustrated in the drawings an "old man" or well known type of portable supporting stand that includes a horizontal base 1 having a block 2 forming part of the mount for a heavy C-shape clamping device by means of which the stand may be stabilized and held down in desired position for drilling operations.

The stand also includes an upright cylindrical post 3 rigid with the base, and a horizontally disposed suspending arm 4 is mounted on the post for vertical adjustment as well as for rotary or swinging adjustment, and for this purpose the arm is fashioned with a split bearing hub or head 5 having perforated ears 6, 6, for a clamp bolt 7, and a speed-nut 8 having an angular handle 9, is employed for clamping the arm in adjusted position on the post.

The supporting arm is fashioned with a longitudinally extending slot 10, and the motor-operated drill 11, here shown as a pneumatic drill, with its boring bit 12, feed screw 13, and feed wheel 14, attached firmly to feed screw 13, is suspended from the arm and adjustable vertically as well as longitudinally of the supporting arm for drilling operations.

For mounting the drill in suspended position the upper end of the feed screw 13 is threaded into a socket 15 of a suspending head 16 that is equipped with an integral stud 17 passed upwardly through the slot 10 of the supporting arm, and a thrust washer as 18 is interposed between the upper face of the head and the lower face of the arm 4.

On the upper side of the supporting arm an elongated washer 18, which also performs the functions of a clamp plate for the suspending head, is mounted, and the stud which passes through the washer, is provided with a loosely slidable bearing collar 19 that rests upon the top face of the supporting arm. By means of a removable cotter pin 20 passed through a selected one of two transversely arranged holes 21 in the projecting upper end of the stud, the motor-operated drill 11 is suspended and supported from the arm 4. The suspending head with the drill may be vertically adjusted by use of the bolt 7 and longitudinally adjusted toward and away from the post and fixed in adjusted position by quick-detachable clamping means—parts 23 and 18.

For rigidly retaining the suspending head in adjusted position a well known C-type of clamp is illustrated as having a jaw 22 engaging the underside of the arm 4, a clamp screw 23 mounted in bearings 24 and engaging the top face of the clamp plate or elongated washer, and the clamp is provided with a screw handle 25 for ready manipulation of the clamp screw.

The motor-operated drill is provided with the usual handle bars 26, which when the appliance is set up, are of ample length to contact one handle bar with the upright post 3, to resist the pull and absorb the strains and tendency of the drill-unit to revolve due to the force of the rotating motor of the drill, and the drill-unit is firmly held and braced between the supporting arm and the post.

By this arrangement of parts, the appliance is rigidly retained leaving the operator free to devote his attention to the drilling operation, and he is enabled to manipulate the force-feed of the drill with one hand while his other hand is free to lubricate the bit and bore.

The drilling unit is rigidly stabilized and braced against wobbling to insure a clean cut, and when the hole is bored the still revolving bit, because of its stabilized position cannot deform the surrounding wall of the bore, and may be withdrawn with facility, making "side-bites" impossible and leaving a clean-cut hole.

Having thus fully described my invention, what I claim as new and desire to secure by Letters Patent is:

In a portable motor operated appliance, the combination with a stand including an upright post, a horizontal arm having an opening at one end thereof fitted over the post for vertical adjustment thereon, said horizontal arm having a slot formed longitudinally thereof and extending inwardly from a point adjacent to the free end thereof, a head formed with an upstanding stud extended through the slot, an elongated washer disposed longitudinally of the arm directly over the slot, said elongated washer having an opening adjacent to one end thereof in which the stud is rotatably mounted, a clamp clamping the opposite end of the washer to said arm, securing the head in positions of adjustment, a feed screw secured to the head and being threaded in an opening of a drill, whereby said drill is adjusted vertically to and from its work.

JOHN E. GAY.

REFERENCES CITED

The following references are of record in the file of this patent:

UNITED STATES PATENTS

| Number | Name | Date |
|---|---|---|
| 779,174 | Moore | Jan. 3, 1905 |
| 1,117,917 | Schoenky | Nov. 17, 1914 |
| 2,392,070 | Snyder | Jan. 1, 1946 |